Nov. 13, 1934.  J. J. VICKERILLA  1,980,646
VEHICLE WHEEL HUB CAP
Filed June 18, 1934  2 Sheets-Sheet 1
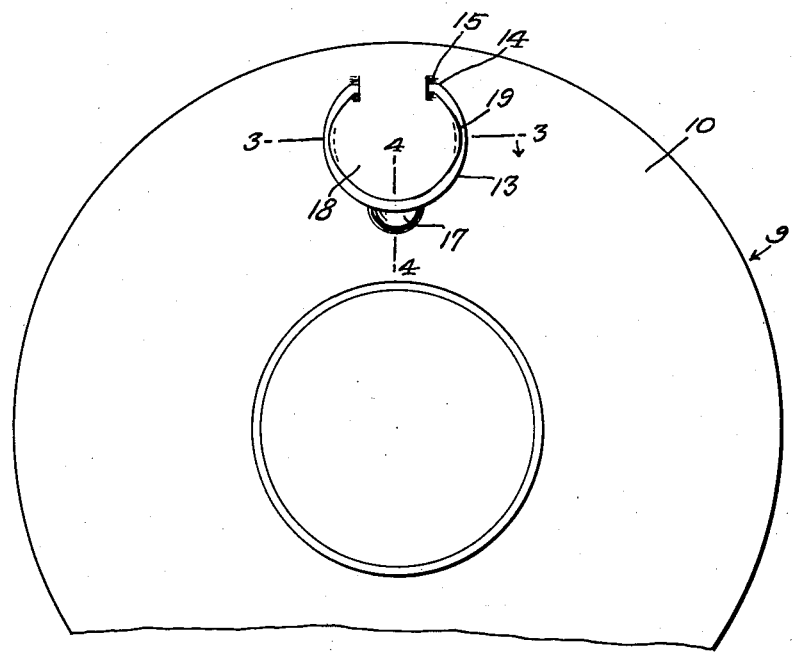
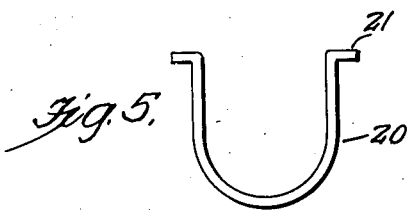
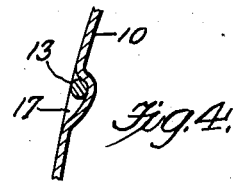
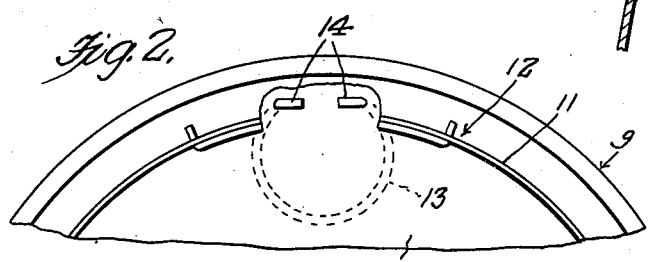
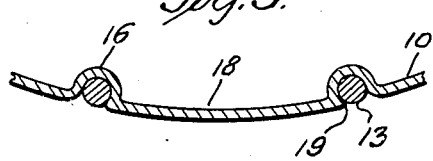
Inventor
John J. Vickerilla,
By *Clarence A. O'Brien*
Attorney Nov. 13, 1934.  J. J. VICKERILLA  1,980,646
VEHICLE WHEEL HUB CAP
Filed June 18, 1934   2 Sheets-Sheet 2
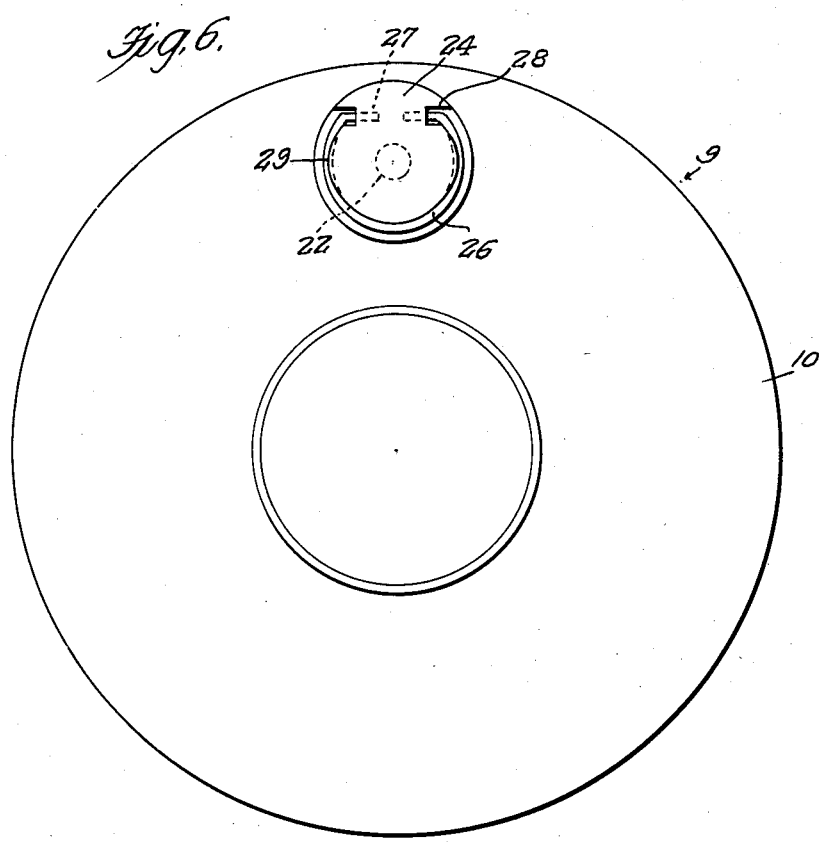
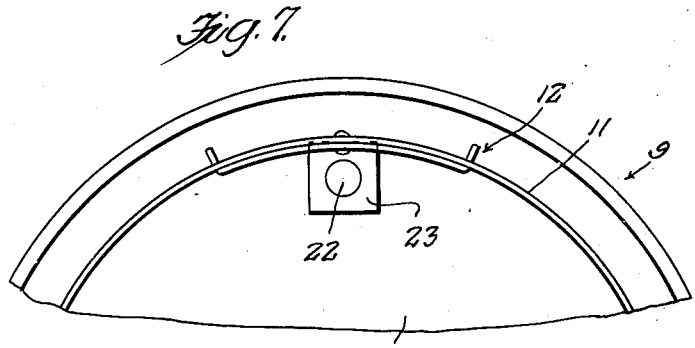
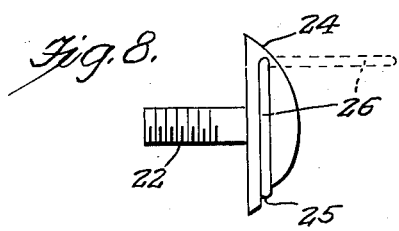
Inventor
John J. Vickerilla,
By *Clarence A. O'Brien*
Attorney Patented Nov. 13, 1934

1,980,646

UNITED STATES PATENT OFFICE 1,980,646

VEHICLE WHEEL HUB CAP

John J. Vickerilla, Paterson, N. J.

Application June 18, 1934, Serial No. 731,187

4 Claims. (Cl. 301—108)

This invention relates to an improved hub cap such as is used in connection with present day automobile and vehicle wheels, and has more particular reference to the relatively large disk-like concavo-convex latch-equipped snap-in cover.

It is a matter of common knowledge that the aforesaid type of hub cap is generally provided with resilient retention means of a character calculated to avoid accidental displacement of the cap during ordinary running conditions. It follows, therefore, that when it is desired to remove the cap to expose the bolts and nuts for tire exchange purposes, it becomes necessary to pry the cap off with a screw-driver or similar damaging instrument. I have therefore discovered the need for the provision on such caps of means to facilitate removal without necessitating the use of these instruments.

Briefly described, I have accomplished what I desire through the adoption and use of a simple and economical finger ring provided at a convenient point and adequately mounted to expedite disconnection of the cap by a slight pull.

In reducing the invention to practice and perfecting the preferred embodiment thereof, I have found it expedient and practicable to adopt an arrangement wherein the finger ring will stay put when not in use to avoid rattling while at the same time is conducive to unhampered access to serve as a handy aid and to allow the cap to be removed with facility.

Other features and advantages will become more readily apparent from the following description and drawings.

In the drawings:

Figure 1 is a fragmentary elevational view of a conventional style or type of hub cap equipped with the improved handle forming means.

Figure 2 is an inside elevational view with portions of the rim broken away to disclose the trunnion forming terminals or prongs of the finger ring.

Figures 3 and 4 are horizontal and vertical sectional views taken on the planes of the lines 3—3 and 4—4 respectively of Figure 1.

Figure 5 is a detail view of a U-shaped bail wherein the terminals are directed outwardly instead of inwardly merely to illustrate a convertible phase of the invention.

Figure 6 is a view similar to Figure 1 showing the finger ring and mounting constructed as a separate attachment applicable to hub caps not manufactured with the invention thereon as an original feature thereof.

Figure 7 is a view similar to Figure 2 looking at the inside and showing the retaining nut of the attachment illustrated in Figure 6.

Figure 8 is a detail elevational view of the principal parts of the attachment form of the invention.

It is evident that the form of the invention illustrated in Figure 1 as contrasted with that in Figure 6 is fundamentally the same. The principal distinction is that the arrangement depicted in Figure 1 is a type wherein the invention is built into the cap at the time of original manufacture or construction. In Figure 6, however, it is in the form of an attachment which may be sold as such and applied to the present day cap by simply boring a bolt hole in the marginal portion of the cap.

In Figures 1 to 4 inclusive it will be observed that the hub cap proper is denoted by the numeral 9, it being of the customary circular or disk-like form and embodying a concavo-convex plate or shell 10 forming the body. This is, of course, suitably ornamented and, as shown in Figure 2, is provided on its interior with an annular snap-in flange 11 having suitable retention clips 12.

The pull handle is, specifically stated, in the nature of a finger ring 13 of appropriate proportions. The separated end portions of the ring are provided with inturned terminals 14 which function as hinge trunnions 14. These are rockably mounted in depressions or seats 15 appropriately fashioned to allow for pivotal movement of the ring and to provide a simple hinge connection between the ring and the cap. In order to hold the ring in a non-swinging position while not in use, I have found it expedient and practicable to adapt the adjacent portion of the cap to allow the ring to be seated immovably therein. This is accomplished by bending the metal as at 16 in Figure 3 to form what may be designated as a ring-like keeper groove. This groove allows the ring to recede into it and it thereby assumes a position substantially flush with the body portion. It will be noted that the body portion is provided as at 17 with a finger-nail niche to facilitate lifting the ring to its pulling position. It will be further noted that that portion of the metal which is surrounded by the finger ring and which is denoted at 18 has diametrically opposed portions thereof formed with extending lips 19. These elements 19 function as detents and cooperate with the groove in keeping the ring seated therein. The groove and ring are so proportioned with respect to each other as to cause the ring to spread slightly in diameter when it is seated in the groove so that it is resiliently retained in place. When seated in the groove the ring is securely held against free swinging by the detents 19.

The only purpose in showing the U-shaped style of bail 20 in Figure 5 is to illustrate a substitute type of finger grip and pull device wherein the terminals 21 may be bent outwardly instead of inwardly. Under such circumstances the cap features are of course adjusted to accommodate this reverse trunnion arrangement.

In Figures 6, 7, and 8, as before indicated, the invention is in the nature of an attachment applicable to an ordinary hub cap such as is now found to be in use without handle means. In this arrangement, the cap and other features are designated by the same numerals as already used, it being understood that in order to adapt the cap for the attachment, it is only necessary to form a bolt hole therein. This hole serves to accommodate the screw threaded shank or stem 22 of the bolt. The stem, in turn, is equipped with a retaining nut 23 as shown in Figure 7 to hold the bolt in place. The head 24 of the bolt is sufficiently large to serve the purpose and is fashioned to fit snugly against the adjacent surface of the cap as shown in Figure 6. This head 24 is provided with a keeper groove 25 to accommodate the resilient finger ring 26, this ring being hingedly attached as at 27 in bearing sockets 28 provided therefor. As seen in Figure 6, the head is provided with diametrically opposed outstanding lips or detents 29 which cause the ring to stay put.

Generically stated, it is evident that in both forms of the invention, the hub cap is provided at a suitable and predetermined point with a keeper groove to accommodate a hingedly mounted resilient snap-tight finger ring, this being true whether the groove is formed as a permanent part of the body of the cap or as a part of the head 24 mounted on the cap. Stated otherwise, it may be said that the cap is provided with a portion to accommodate a hinged resilient finger ring wherein said portion is in turn provided with a keeper groove and further provided with diametrically opposed outstanding lips or detents to hold the finger ring down in an out-of-the-way, non-rattling position.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice, if desired.

What is claimed is:

1. An automobile hub cap of the class described comprising a resilient snap-in cap, and a hingedly attached finger ring carried thereby, said cap being formed with a keeper groove for reception of said finger ring, said groove being of a diameter in relation to the normal diameter of the finger ring to spread the finger ring when it is seated in said groove, whereby to employ the resilient retention properties of said ring to aid in holding it in the groove.

2. An automobile hub cap of the class described comprising a resilient snap-in cap, and a hingedly attached finger ring carried thereby, said cap being formed with a keeper groove for reception of said finger ring, said groove being of a diameter in relation to the normal diameter of the finger ring to spread the finger ring when it is seated in said groove, whereby to employ the resilient retention properties of said ring to aid in holding it in the groove, and portions of the cap adjacent said groove being provided with diametrically opposed outstanding lips constituting retaining elements.

3. An automobile hub cap of the class described comprising a disk-like shell provided with an eccentrically arranged keeper groove of substantially circular form, portions of the metal adjacent said groove being projected at diametrically opposed points to provide detents, and a finger ring seatable in said groove and engageable releasably with said detents, said finger ring being of a split resilient type and having its terminating ends formed into trunnions hingedly attached to the cap.

4. A structure of the class described comprising an automobile wheel hub cap embodying a plate having an attaching flange and means for holding the flange securely in locked position, a pivoted finger ring hingedly attached to the marginal portion of said plate, said plate being provided adjacent said finger ring with a seat for reception of the ring permitting it to be swung to and maintained in an out-of-the-way position substantially flush with the plate, and co-acting means between the plate and ring for resiliently and releasably maintaining the ring in said closed out-of-the-way position.

JOHN J. VICKERILLA.